United States Patent
Huether et al.

[19]

[11] Patent Number: 6,072,606

[45] Date of Patent: *Jun. 6, 2000

[54] CLOSE-LIT HOLOGRAPHIC NIGHTLIGHT DISPLAY LIGHTING SYSTEM

[75] Inventors: James L. Huether, 7375 Rollingdell Dr., #55, Cupertino, Calif. 95014; Robert A. Hess, Boulder Creek, Calif.

[73] Assignee: James L. Huether, Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/812,960

[22] Filed: Mar. 5, 1997

[51] Int. Cl.⁷ ................................................. G02B 27/22
[52] U.S. Cl. ............................... 359/15; 359/13; 359/22; 359/32
[58] Field of Search ................................. 359/15, 32, 34, 359/1, 13, 22; 385/37, 146; 349/61–63, 65, 67

[56] References Cited

U.S. PATENT DOCUMENTS

| | | | |
|---|---|---|---|
| 4,830,445 | 5/1989 | Robinson | 350/3.85 |
| 4,940,301 | 7/1990 | Sallai | 350/3.6 |
| 5,121,229 | 6/1992 | Benton et al. | 359/32 |
| 5,355,600 | 10/1994 | Thompson | 40/435 |
| 5,418,631 | 5/1995 | Tedesco | 359/15 |
| 5,682,255 | 10/1997 | Friesem et al. | 359/15 |
| 5,822,088 | 10/1998 | Danno et al. | 359/1 |

FOREIGN PATENT DOCUMENTS

| | | | |
|---|---|---|---|
| 0 348 137 | 12/1989 | European Pat. Off. | F24C 7/00 |
| 2 239 340 | 11/1989 | United Kingdom | G09F 19/12 |

*Primary Examiner*—Cassandra Spyrou
*Assistant Examiner*—Leo Boutsikaris
*Attorney, Agent, or Firm*—D'Alessandro & Ritchie

[57] ABSTRACT

A holographic display system provides a holographic image suitable for use as a nightlight in a dimly lit environment wherein the only light in the field of view of the user is essentially the light diffracted into the holographic image being replayed. The holographic display system includes a low watt light source, a hologram recorded with a reference beam matching the beam of the light source employed to replay the hologram, and an enclosing structure for holding the lightsource and hologram in registration wherein the enclosure is configured so that the only light emitted from the display system is emitted from the hologram.

60 Claims, 2 Drawing Sheets

CLOSE-LIT HOLOGRAPHIC NIGHTLIGHT DISPLAY LIGHTING SYSTEM

BACKGROUND OF THE INVENTION

1. Field of the Invention

The present invention relates to holographic display systems. More particularly, the present invention relates to holographic display systems wherein the light source illuminating the hologram for replay is in close proximity to the hologram, and the holographic image is light source modification suitable as a room illumination device in a dim light environment.

2. The Prior Art

Holograms are a well-known, visually fascinating, and entertaining way of producing 3-D holographic images for viewing. A hologram is a recording of information that can be illuminated with a beam of light to reconstruct or "replay" the holographic image recorded in the hologram. Improved detail and realism of holographic images have resulted in the application of holography to medicine, business, the arts, etc. when very detailed and accurate 3-D images are desired.

The sharpness of the image produced by a hologram is affected by the manner in which a hologram is illuminated. It is well known in the art that a laser light source typically provides illumination to a hologram to produce the sharpest image possible, but the cost and know-how required to implement the laser light source can be prohibitive. It is also known in the art to use an incandescent lamp or "white light" source for illuminating holographic image for replay.

With an incandescent source, however, the quality of the image produced depends particularly upon how accurately the reconstruction source matches the "reference source" used to record the holographic image in the hologram. As a consequence, without a good match, using an incandescent source can result in a blurred image during replay. One remedy to this problem, known in the art, is to place the incandescent source a long distance from the hologram so as to reduce the effective angle subtended by the light source at a point on the surface of the hologram. This is known to those of ordinary skill in the art as reducing the extent of the light source. In this manner, the incandescent source can be made to represent an approximation of a point light source.

It has been found, however, that placing the light source a long distance from the hologram is often times not a practical implementation. To overcome this practical defect, various arrangements of reflectors used to fold the light beam back on itself are known in the art. These known systems are often expensive and bulky, and as a result, are not useful for many of the applications to which holographic images can be put.

Another approach, disclosed in UK Patent Application No. 2 239 340, to overcoming blurring due to the extent of the light source which occurs in employing a white light source for illumination, without unduly increasing the distance between the source of illumination and the hologram, a linear light source was employed, wherein the linear light source extended substantially parallel to the surface plane of the hologram. The linear light source comprised either an elongated filament extending parallel to the plane of the hologram or a light source shining through an elongated slip or collimator.

Though this approach may have reduced the source extent blurring of the replayed image in the direction perpendicular to the length of the filament, a light source configured in this manner still blurs the replayed image in the direction parallel to the filament. Also, due to the intensity of the disclosed linear filament light source, the replayed holographic image would produce a bright illumination not suitable for use in low light environments, and the disclosed shielding would not substantially prevent reflected and scattered light from the linear light source from adding to the illumination of a hologram user's viewing area. Further, the light source enclosure does not prevent the scattering or reflecting of light towards the hologram. The scattered or reflected light reconstructs ghost images and effectively increases the extent of the light source to blur the desired image.

OBJECTS AND ADVANTAGES OF THE INVENTION

Accordingly, it is an object of the present invention to provide an illuminating light source for a holographic image replay which is in close proximity to the hologram.

It is a further object of the present invention to provide a replay of a holographic image in a dim light environment wherein retroreflective or light absorbing coating is applied to the enclosure containing the light source.

It is yet another object of the present invention to provide a holographic system which provides enough illumination from the holographic image to be suitable for use as a night light in a dim light environment.

It is a further object of the present invention that the close lit light source used in illuminating a hologram for replay be a small incandescent bulb or LED representing an approximation to a point source in both horizontal and vertical dimensions.

It is yet another object of the present invention that substantially no stray light in a close light source employed to illuminate a hologram for replay be presented to the visual field of a viewer.

It is another object of the present invention that glare light from a close lit light source used to illuminate a hologram for replay that is reflected off of the surface of the hologram be substantially removed from the visual field of the viewer.

It is a further object of the invention to provide a reference illumination to record the hologram which matches the wavefront curvature of the reconstruction beam emitted from a light source that is used to replay the image held in close proximity to the hologram.

It is a further object of the present invention to pre-distort the source artwork used in recording the hologram so that a reconstruction beam from a light source used to replay the holographic image which does not match the curvature of the reference beam will replay an undistorted image.

It is a further object of the present invention that the hologram, when inserted in the hologram display system housing, will switch power to the light source.

It is yet another object of the present invention to provide power to the light source in the holographic display system by using batteries.

These and many other objects and advantages of the present invention will become apparent to those of ordinary skill in the art from a consideration of the drawings and ensuing description of the invention.

BRIEF DESCRIPTION OF THE INVENTION

According to the present invention, a holographic display system provides a holographic image suitable for use as a nightlight in a dimly lit environment wherein the only light in the field of view of the user is essentially the light diffracted into the holographic image being replayed. The holograms employed in the holographic display system are recorded with a reference beam having a wavefront which matches the wave front of the light source to perform accurate reconstruction of the holographic image when the light source is in close proximity to the hologram. A specially fabricated lens provides the required optical property of a short focal length and large aperture for the reference beam used to record the image on the hologram plate.

In one aspect of the present invention, the housing has the dimensions of approximately 2.5 inches deep by 6 inches tall by 3 inches wide. The housing is coated with or made from a light absorbing material so that any light which strikes its surface is not reflected back toward the hologram. The front side of the housing comes down in front of the light source so that light does not emanate from the light source on the side which is not facing the hologram plate. The light source is positioned approximately 0.5 inches from the front overhang of the housing so that sufficient airflow will reach the light source for cooling.

In another aspect of the present invention, the hologram has dimensions of 3×4 inches and is positioned at approximately a 25° angle from the vertical. The light source is placed approximately four inches from the center of the hologram at an angle of approximately 54° to the normal of the hologram.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
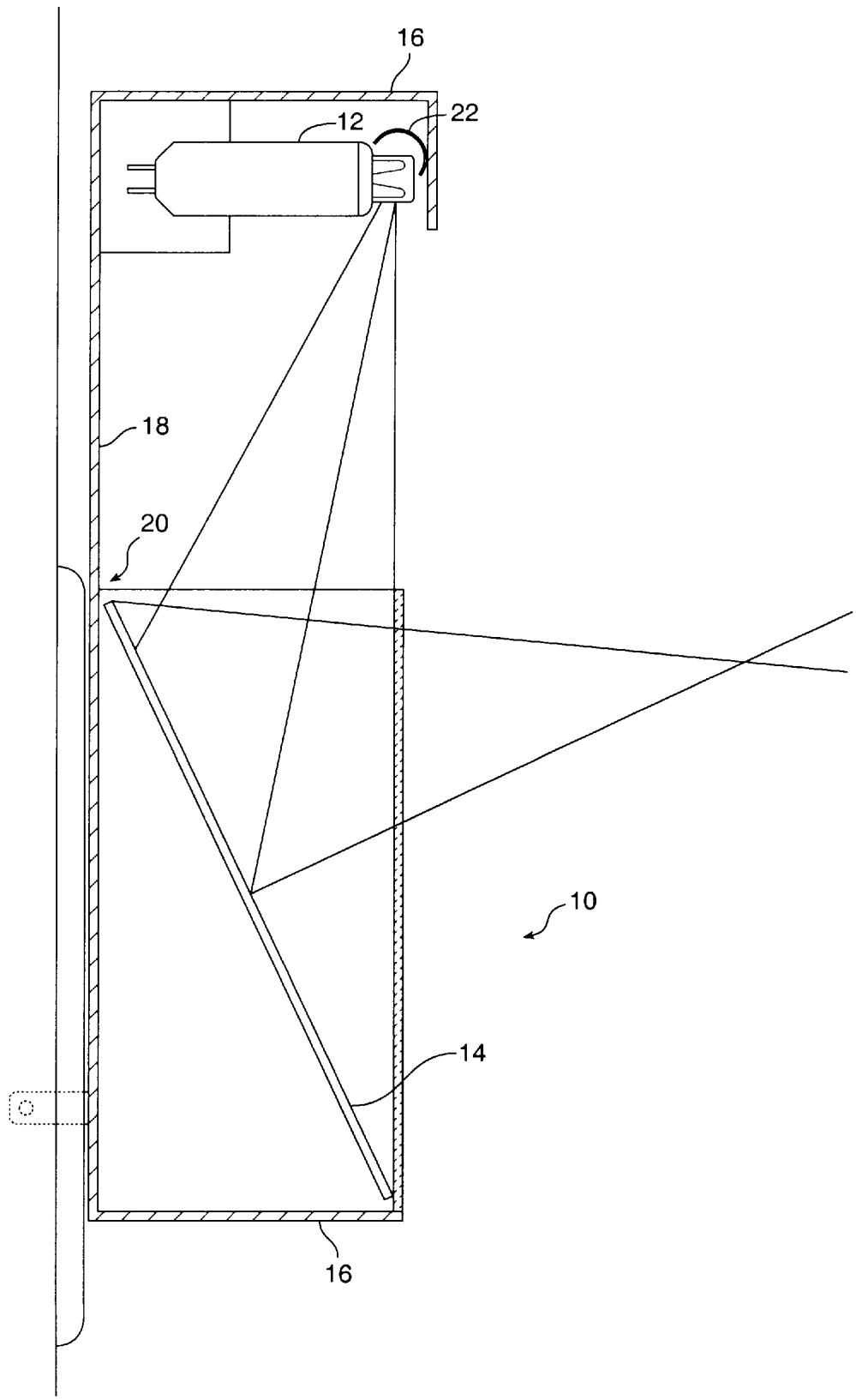
FIG. 1 is an illustration of a side view of the holographic display apparatus according to the prevention.

FIG. 1 illustrates a holographic display system 10 suitable for use as a night light or dim light which is used in darkness or dimly lit environment for safety, security or decoration according to the present invention. In holographic display system 10, a light source 12 for illuminating a hologram 14 for replay of a holographic image previously recorded in the hologram 14 is in close proximity to the hologram 14. Both the light source 12 and the hologram 14 are disposed within a housing 16.

The registration of the light source 12 and hologram 14 within the housing is such that any light from the light source 12 which does not fall upon the hologram 14 remains within the housing. Further, light from the light source 12 which falls upon the surface of the hologram that is reflected off the surface of the hologram, but not used by the hologram 14 to replay the holographic image is directed below the visual field of the viewer. By eliminating these two sources of extraneous light, the only light in the viewing field is essentially the light diffracted into the holographic image being replayed.

In the preferred embodiment, the holographic display system 10 of the present invention is employed as a night light used in a dim light environment. It was envisioned that the night light would be placed on a wall outlet at a height of approximately twelve inches off of the floor. Accordingly, the registration of the light source 12 and the hologram 14 in the housing 16 was performed to provide the viewing zone and the path for the glare light as shown schematically in FIG. 2. However, it should be appreciated that the holographic display system 10 may be powered by batteries, is portable, and may be positioned other than near the floor.

Figure 2:
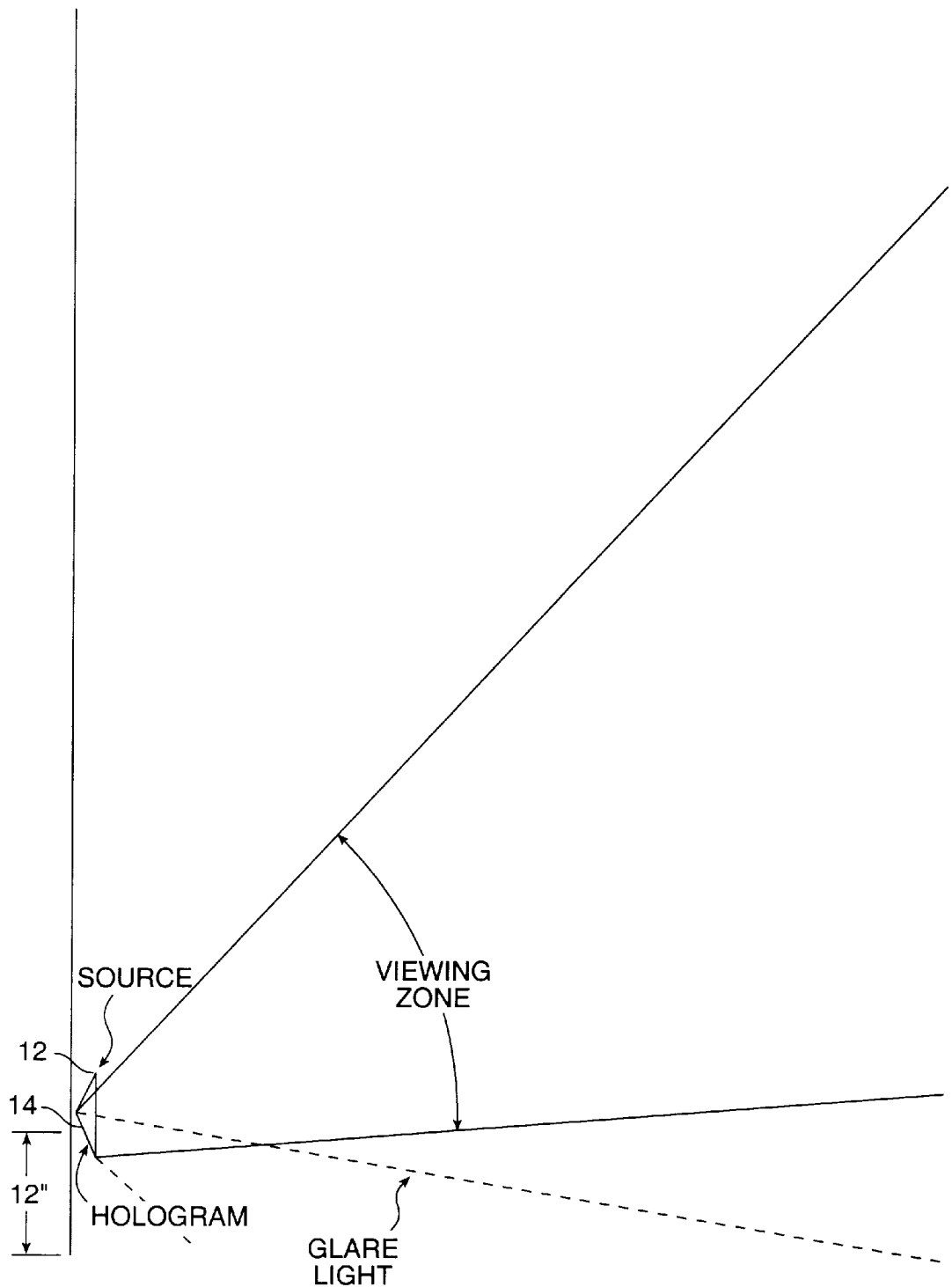
FIG. 2 is a schematic representation of the registration of the light source and the hologram and the resulting field of view according to the present invention.

In the schematic diagram in FIG. 2, the housing itself is not shown. Further, in FIG. 2, to avoid unnecessary duplication of reference numerals, elements in FIG. 2 which correspond to elements in FIG. 1 are given the same reference numerals in both figures.

In the preferred embodiment depicted in FIGS. 1 and 2, a 3×4 inch hologram 14 is positioned at approximately a 25° angle from the vertical. The light source is placed approximately 4 inches from the center of the hologram 14 at an angle of approximately 54° to the normal of the hologram 14. The angle of the light source 12 to the hologram 14 was made large to maximize the viewing zone of the holographic image and minimize the size of the source enclosure, while not exceeding the capability of practical hologram recording materials regarding resolution and spatial frequency bandwidth for linear recording. The light source 12 to hologram distance 16 was made small to minimize the size of the holographic display system 10, and to maximize the brightness of the holographic image being replayed.

With the registration of light source 12 to the hologram plate 14 described, the viewing zone begins approximately 4° above the horizontal from a point fixed at the bottom of the hologram plate 14, and extends through an angle of approximately 40°. Further, with the hologram 14 in this position, the glare light is directed to an area at approximately a 9° angle below the horizontal emanating from a point at the top of the hologram plate 14. It should be appreciated that the direction of the viewing zone may be adjusted by including on the housing a vertical and/or horizontal swivel which can be used to tilt the housing 16.

The housing 16, which in the preferred embodiment has the dimensions of approximately 2.5 inches deep by 6 inches tall by 3 inches wide, has features which prevent stray light from falling into the visual field of the user. The housing 16 is coated with or made from a light absorbing material 18 so that any light which strikes its surface is not reflected back toward the hologram, and the front side of the housing comes down in front of the light source 12 so that light does not emanate from the light source on the side which is not facing the hologram plate 14. Alternatively, the housing 16 can be fabricated to allow some stray light to be emitted through the housing 16 in order to project a light pattern onto a wall, a ceiling or a floor. These light patterns can either be simple such as a circle or rectangle, or complex in nature, such as a group of stars.

Further, in the placement of the light source 12 in the housing 16, the light source 12 was positioned approximately 0.5 inches from the front overhang of the housing 16 so that sufficient airflow could reach the light source 12 for cooling. The housing 16 may also include a photodetector to turn on the holograph display system 10 in low light situations, and/or be turned on and off by a switch 20 which is activated when the hologram 14 is inserted into the housing 16.

In the present invention, to avoid distortion of the holographic image during replay which occurs when a light source 12 is placed in close proximity to a hologram 14, the hologram 12 is recorded in a manner to be described below that will accurately reconstruct the holographic image when the hologram 12 is positioned in the holographic display system 10 as described. The distortion in the holographic image in minimized when the size of the hologram is small compared to the light source 12 to hologram 14 distance.

However, when these two measurements approach unity, as found in the preferred embodiment, the distortions to the holographic image in the viewing zone are more pronounced. The problem arises because the curvature of the wavefront emitted from the light source does not accurately match the curvature of the wavefront of the reference beam of light used to record the holographic image in the hologram plate. It will be appreciated that accurate wavefront matching is important when deeper and or more projected images are being produced and when the detail and general realism of the image becomes more important.

There are several ways to record the hologram 14 to minimize the distortion caused during replay by a light source 12 at a close distance to the hologram 14. In the preferred embodiment, a specially fabricated lens which provides the required optical property of a short focal length and large aperture was used to record the image on the hologram plate. Other approaches known to those of ordinary skill in the art include the use of intermediary holograms, and pre-distorted art work. By providing holograms for the holographic display system 10 which perform accurate reconstruction of the holographic image when the light source is in close proximity to the hologram, a low watt light source 12 can be employed in the present invention, and as a consequence the holographic display system may be battery powered.

In the preferred embodiment, the light source 12 employed in the holographic display system 10 was a Sylvania Model No. 120PC. This is 120 volt, 3 watt pilot cartridge type lamp which has a lifetime of 7500 hours. This particular lamp was chosen because of several characteristics. Its power of 3 watts provides adequate illumination as a night light or dim light which is used in darkness or dimly lit environment for safety, security or decoration according to the present invention. As will be appreciate by those of ordinary skill in the art, by operating at 120 volts the holographic display system 10 of the present invention may be connected to a standard wall outlet without a transformer.

The filament of the selected lamp comprises a relatively compact group of short luminous filament elements to provide a better approximation of a point light source. The design of the electrical contact pins is offset so that the filament may be predictably and repeatedly positioned to provide a light source of minimal extent to the hologram. With the offset of the electrical contact pins, a spherical concave reflector 22 may be positioned behind the lamp with the lamp at its center of curvature so that an inverted image of the filament is caused to overlap the filament itself, and thereby increase the amount of light directed toward the hologram without significantly increasing the effective extent of the source. It will be readily appreciated by those of ordinary skill in the art that other lamps may also be suitable for use in the present invention. For example, a battery powered or a wall outlet with a transformer embodiment of the present invention could use a lamp designed for operation at less than 12 volts. A lamp of this type typically has a smaller filament size, and as a result, the extent of the light source will be further reduced.

The hologram 14 of the present invention is preferably a 3×4 inch image-planed reflection hologram which may be easily inserted into and removed from the housing 16. In this manner, the holographic image which is replayed from the holographic display system 10 may be easily changed. As is well understood by those of ordinary skill in the art, the image-planed reflection format provides a real projected and full parallax image with a black background. The preferable recording material in the hologram 14 is a photopolymer from DuPont called Omnidex(TM). The Omnidex(TM) material is suitably inexpensive for the present invention because it can be machined processed on rolls, backed and die cut with a complex pattern. Further, it is capable of reconstructing a suitable spectral bandwidth with adequate diffraction efficiency in an image having an amount of projection desired herein. It should be appreciated by those or ordinary skill in the art that other materials and/or holographic formats could be used to form the hologram 14, including for example, a silver-halide reflection type or injection molded or cast surface relief.

It should be appreciated by those of ordinary skill in the art, that any type of reflection hologram in a volume recording material or surface relief hologram on a dark substrate can be employed according to the present invention. Further, any holographic image generation technique well known to those of ordinary skill in the art, such as full-parallax or single parallax integrals, multi-channel imaging, or multi-exposure imaging may be employed in the holographic display system, according to the present invention.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A holographic display system including:
    a light source;
    a hologram;
    an enclosing structure, said light source disposed adjacent said hologram within said enclosing structure such that light from said light source falls directly on the surface of said hologram, said light source positioned in relation to said hologram in said enclosing structure such that only diffracted light emitted from said hologram is provided outside of said enclosing structure in a field of view of said holographic display system.

2. A holographic display system as in claim 1 further including a swivel to rotate said holographic display system along a vertical axis to adjust the direction of the filed of view of said holographic display system.

3. A holographic display system as in claim 1 further including a swivel to rotate said holographic display system along a horizontal axis to adjust the direction of the filed of view of said holographic display system.

4. A holographic display system as in claim 1 wherein a portion of said enclosing structure supporting said hologram has a light absorbing material on an inner wall.

5. A holographic display system as in claim 1 wherein said hologram is a close-lit hologram.

6. A holographic display system as in claim 1 wherein a recordation of an object in said hologram is pre-distorted to be compatible with a wavefront curvature of said light source.

7. A holographic display system as in claim 1 wherein said hologram is recorded with a reference illumination that matches the wavefront curvature of said light source of said holographic display system.

8. A holographic display system as in claim 1 further including a switch mounted on said enclosing structure, said switch being actuated when said hologram is inserted in said enclosing structure.

9. A holographic display system as in claim 1 wherein said hologram is positioned in said enclosing structure at about a 25° angle formed between said hologram and a vertical axis.

10. A holographic display system as in claim 1 wherein said light source is positioned in said enclosing structure at about a 54° angle to the normal of the hologram.

11. A holographic display system as in claim 1 wherein a portion of said enclosing structure surrounding said light source has a light absorbing material on an inner wall.

12. A holographic display system as in claim 1 wherein a portion of said enclosing structure surrounding said light source has a retro-reflective coating on an inner wall.

13. A holographic display system as in claim 1 further including a concave spherical reflector positioned behind said light source such that said light source is at a center of curvature of said spherical reflector to provide an inverted image of the the light source that overlaps the light source without significantly increasing the effective extent of the light source.

14. A holographic display system as in claim 1 wherein said light source comprises a compact group of short filaments.

15. A holographic display system as in claim 1 wherein said light source has a minimal extent for said hologram.

16. A holographic display system as in claim 1 wherein said enclosing structure further includes a plurality of apertures for emitting light to other than said field of view.

17. A holographic display system comprising:
   a light source approximating a point source in horizontal and vertical dimensions;
   a hologram; and
   an enclosure having a first portion and a second portion, said first portion supporting said hologram and having light absorbing material on an inner wall and said second portion supporting said light source, said light source disposed adjacent said hologram within said enclosure such that light from said light source falls directly on the surface of said hologram to form a holographic image outside of said enclosure in a field of view of said holographic display, said light absorbing material on said inner wall disposed to prevent any light that falls on said absorbing material from forming a portion of said holographic image.

18. A holographic display system as in claim 17 further including a swivel to rotate said holographic display system along a vertical axis to adjust the direction of the filed of view of said holographic display system.

19. A holographic display system as in claim 17 further including a swivel to rotate said holographic display system along a horizontal axis to adjust the direction of the filed of view of said holographic display system.

20. A holographic display system as in claim 17 wherein said hologram is a close-lit hologram.

21. A holographic display system as in claim 17 wherein a recordation of an object in said hologram is pre-distorted to be compatible with a wavefront curvature of said light source.

22. A holographic display system as in claim 17 wherein said hologram is recorded with a reference illumination that matches the wavefront curvature of said light source of said holographic display system.

23. A holographic display system as in claim 17 further including a switch mounted on said enclosure, said switch being actuated when said hologram is inserted in said enclosure.

24. A holographic display system as in claim 17 wherein said hologram is positioned in said enclosure at about a 25° angle formed between said hologram and a vertical axis.

25. A holographic display system as in claim 17 wherein said light source is positioned in said enclosure at about a 54° angle to the normal of the hologram.

26. A holographic display system as in claim 17 wherein a said second portion of said enclosure has a light absorbing material on an inner wall.

27. A holographic display system as in claim 17 wherein said second portion of said enclosure has a retro-reflective coating on an inner wall.

28. A holographic display system as in claim 17 further including a concave spherical reflector positioned behind said light source such that said light source is at a center of curvature of said spherical reflector to provide an inverted image of the the light source that overlaps the light source without significantly increasing the effective extent of the light source.

29. A holographic display system as in claim 17 wherein said light source comprises a compact group of short filaments.

30. A holographic display system as in claim 17 wherein said light source has a minimal extent for said hologram.

31. A holographic display system as in claim 17 wherein said enclosure further includes a plurality of apertures for emitting light to other than said field of view.

32. A holographic display system comprising:
   a light source;
   a hologram providing illumination as a holographic image in a low-light environment; and
   an enclosure, said light source disposed adjacent said hologram within said enclosure such that light from said light source falls directly on the surface of said hologram, said light source positioned in relation to said hologram in said enclosure such that glare light from said light source reflected off said hologram is removed from a visual field outside of said enclosure of said holographic display system in said low-light environment.

33. A holographic display system as in claim 32 further including a swivel to rotate said holographic display system along a vertical axis to adjust the direction of the filed of view of said holographic display system.

34. A holographic display system as in claim 32 further including a swivel to rotate said holographic display system along a horizontal axis to adjust the direction of the filed of view of said holographic display system.

35. A holographic display system as in claim 32 wherein a portion of said enclosure supporting said hologram having a light absorbing material on an inner wall.

36. A holographic display system as in claim 32 wherein said hologram is a close-lit hologram.

37. A holographic display system as in claim 32 wherein a recordation of an object in said hologram is pre-distorted to be compatible with a wavefront curvature of said light source.

38. A holographic display system as in claim 32 wherein said hologram is recorded with a reference illumination that matches the wavefront curvature of said light source of said holographic display system.

39. A holographic display system as in claim 32 further including a switch mounted on said enclosure, said switch being actuated when said hologram is inserted in said enclosure.

40. A holographic display system as in claim 32 wherein said hologram is positioned in said enclosure at about a 25° angle formed between said hologram and a vertical axis.

41. A holographic display system as in claim 32 wherein said light source is positioned in said enclosure at about a 54° angle to the normal of the hologram.

42. A holographic display system as in claim 32 wherein a portion of said enclosure surrounding said light source has a light absorbing material on an inner wall.

43. A holographic display system as in claim 32 wherein a portion of said enclosure surrounding said light source has a retro-reflective coating on an inner wall.

44. A holographic display system as in claim 32 further including a concave spherical reflector positioned behind said light source such that said light source is at a center of curvature of said spherical reflector to provide an inverted image of the the light source that overlaps the light source without significantly increasing the effective extent of the light source.

45. A holographic display system as in claim 32 wherein said light source comprises a compact group of short filaments.

46. A holographic display system as in claim 32 wherein said light source has a minimal extent for said hologram.

47. A holographic display system as in claim 32 wherein said enclosure further includes a plurality of apertures for emitting light to other than said field of view.

48. A holographic display system comprising:
   a light source;
   a hologram having a recordation of an object that is pre-distorted to be compatible with said light source; and
   an enclosure, said light source disposed adjacent said hologram within said enclosure such that light from said light source falls directly on the surface of said hologram, said light source positioned in relation to said hologram in said enclosure such that an undistorted image of said object is provided in a field of view outside of said enclosure of said holographic display system.

49. A holographic display system as in claim 48 further including a swivel to rotate said holographic display system along a vertical axis to adjust the direction of the filed of view of said holographic display system.

50. A holographic display system as in claim 48 further including a swivel to rotate said holographic display system along a horizontal axis to adjust the direction of the filed of view of said holographic display system.

51. A holographic display system as in claim 48 wherein a first portion of said enclosure supporting said hologram having a light-absorbing material on an inner wall.

52. A holographic display system as in claim 48 further including a switch mounted on said enclosure, said switch being actuated when said hologram is inserted in said enclosure.

53. A holographic display system as in claim 48 wherein said hologram is positioned in said enclosure at about a 25° angle formed between said hologram and a vertical axis.

54. A holographic display system as in claim 48 wherein said light source is positioned in said enclosure at about a 54° angle to the normal of the hologram.

55. A holographic display system as in claim 48 wherein a portion of said enclosure surrounding said light source has a light absorbing material on an inner wall.

56. A holographic display system as in claim 48 wherein a portion of said enclosure surrounding said light source has a retro-reflective coating on an inner wall.

57. A holographic display system as in claim 48 further including a concave spherical reflector positioned behind said light source such that said light source is at a center of curvature of said spherical reflector to provide an inverted image of the the light source that overlaps the light source without significantly increasing the effective extent of the light source.

58. A holographic display system as in claim 48 wherein said light source comprises a compact group of short filaments.

59. A holographic display system as in claim 48 wherein said light source has a minimal extent for said hologram.

60. A holographic display system as in claim 48 wherein said enclosure further includes a plurality of apertures for emitting light to other than said field of view.

* * * * *